Dec. 5, 1967   J. R. SENFT ET AL   3,355,880
BI-METAL MOTOR

Filed Dec. 9, 1965   2 Sheets-Sheet 1

INVENTORS:
James R. Senft
Maurice M. Light
BY:
Harold W. Bergendorf
ATTORNEY.

Dec. 5, 1967  J. R. SENFT ET AL  3,355,880
BI-METAL MOTOR

Filed Dec. 9, 1965  2 Sheets-Sheet 2

INVENTORS.
James R. Senft
Maurice M. Light
BY
Harold W. Beigendorf
ATTORNEY

United States Patent Office 3,355,880
Patented Dec. 5, 1967

3,355,880
BI-METAL MOTOR
James R. Senft, Chicago, and Maurice M. Light, Oak Park, Ill., assignors to Personal Service Mfg. Corp., Chicago, Ill., a corporation of Illinois
Filed Dec. 9, 1965, Ser. No. 512,638
13 Claims. (Cl. 60—23)

ABSTRACT OF THE DISCLOSURE

A motor having two bi-metal arms, each arm being fixed to a support base at one end and being connected to each other at the other end by an elongated bar, the arms and bar forming a rocking member which rocks when one of the arms has its temperature changed to a different temperature level than the other arm.

This invention relates to a motor which is driven by heat sources in which a movable bi-metal arm is employed to transmit the heat energy into the mechanical energy. More specifically this invention relates to a motor for moving a load by supporting the load on one or a pair of bi-metal arms in a gravitationally unstable manner and when the load starts to shift to a gravitationally stable position supplying sufficient heat energy and/or permitting sufficient cooling to one of the bi-metal arms to counteract the shift and thereby continuously maintain the load in varying unstable positions.

The present invention finds utility in the display field of advertising wherein an object is to attract the eye of a passing stranger or can be used as a timer, pacemaker or motor. One effective method of attraction is to move the display since the eye tends to readily notice moving objects. It is desirable to have available a device to move displays which is low cost, rugged in handling, easy to set up, moves rapidly and is dependable in operation. Although electric motors are suitable for this purpose they are expensive, have a large number of parts and must be periodically maintenance serviced. We have conceived of a motor which has a minimum number of parts, is very inexpensive to construct, reliable and easy to set up even for a novice and requires no maintenance. In addition, when electric motors are employed, it is frequently necessary to supply additional lighting to illuminate the display, necessitating further expense.

In order to effectively utilize our invention the display (the actual load on the motor of this invention) is preferably maintained in a gravitationally unstable position. There are three well recognized positions of gravitational equilibrium namely; stable, unstable and neutral. They may be illustrated by a solid three dimensional circular cone. If the cone is supported on its apex it is in an unstable position and if the cone is resting on its side on a level surface it is in a neutral position and if on its base, it is in a stable position. These positions may be summarized as follows: the position is stable if a small displacement of the object gives rise to a restoring force; the position is unstable if a small displacement of the object gives rise to a force which tends to increase the displacement; the position is neutral if a small displacement of the object gives rise to no force. In a body in a stable position the center of gravity of the body falls within the space vertically above the area of support and when the body is given a slight displacement the force of gravity acting on the center of gravity restores the body to its original position. As the area of support gets smaller or the center of gravity gets further away from the area of support, the object becomes less stable. Once the center of gravity assumes a position outside of the space vertically above the area of support, the body is unstable and the force of gravity will act upon the body and pull it down.

In the present invention the display load is carried by two flexible metal arms, at least one of which is bi-metal, attached thereto at one end in which the center of gravity of the load is generally above the line connecting the other ends of the bi-metal arms. In this arrangement the assembled arms and load are in a gravitationally unstable arrangement provided the load is sufficiently large. It is a combination of the gravitational instability of the arms and load, the position of the load and the flexibility of the arms which sustains the motion of the arms and load when the arms are exposed to heat sources.

It is an object of this invention to illuminate a display while simultaneously employing the illuminating agent to supply the energy to drive the motor of this invention.

It is another object of this invention to employ bi-metal to move a display in a continuous rocking motion.

It is still another object of this invention to produce a motor with a minimum number of parts and which is inexpensive to construct.

It is a further object of this invention to produce a motor which can be shipped without danger of damage, which is easy to assemble, reliable, self starting and which moves at a high rate of speed.

It is a more specific object of this invention to produce a motor driven by the heat energy emitted by an illuminating agent to move advertising copy.

It is another more specific object of this invention to produce a forth and back rocking motion to any load such as advertising copy.

It is still another more specific object of this invention to produce a maintenance free motor having two flexible bi-metal arms carrying advertising copy and which are actuated by the heat energy emitted by alternately flashing light bulbs used to illuminate the advertising copy.

These and other objects will become more apparent in the light of the foregoing detailed description.

Figure 1:
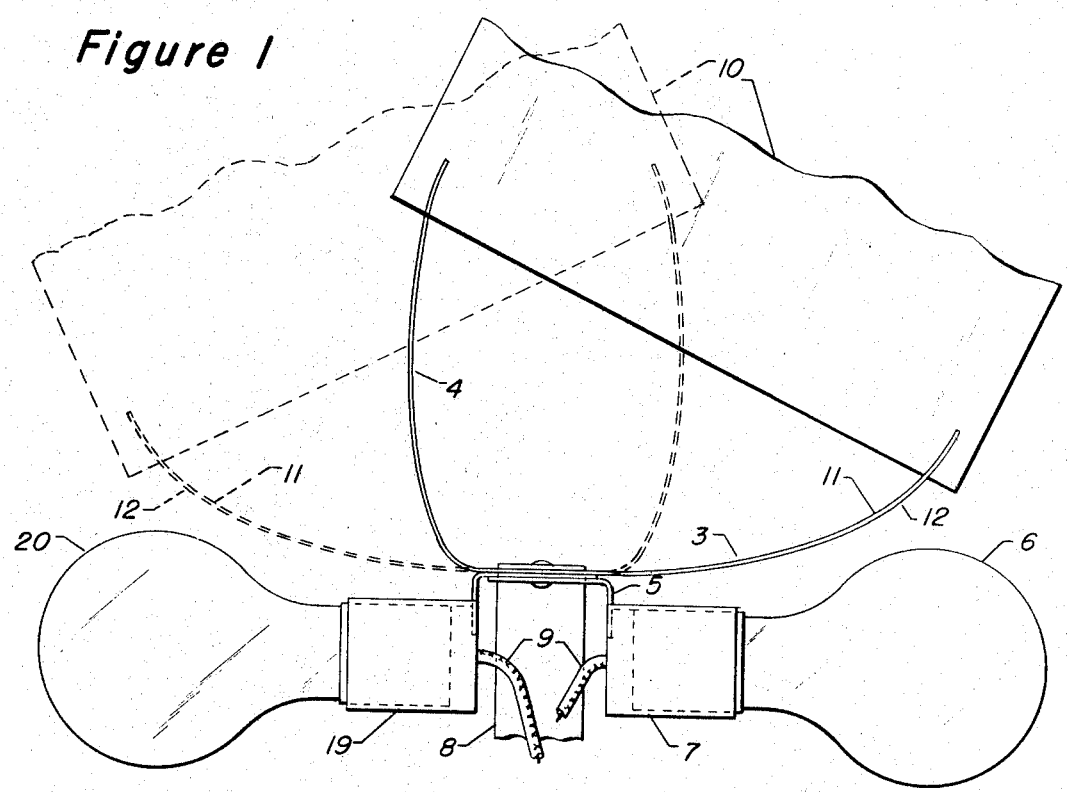
FIGURE 1 is a preferable embodiment of the bi-metal motor of this invention showing two alternate positions during the operation of the motor.

In FIGURE 1 base 8 supports a pair of flexible metal arms 3 and 4, at least one of which is bi-metal. It will be assumed that both arms 3 and 4 are constructed of bi-metal although it is to be understood that the motor will function with a single bi-metal arm and a single heat source as is described hereinafter. The arms may be formed of a single strip of bi-metal, supported in its center by base 8 or alternately may be two strips of bi-metal, one end of each of which is attached to base 8. The bi-metal is attached to the base at one end by means such as a flat cover plate on top of the bi-metal and a screw or other fastener to force the cover plate down on the bi-metal thereby holding it in place. Alternately the bi-metal may be secured to the base by welding, etc. Both arms 3 and 4 are attached at their other end to display load 10 and form the support for load 10. Any convenient method of attachment may be employed as for example; cutting a length of about ½ inch into load 10 and slipping the thin bi-metal in along the cut length, forming a fastening clip out of the bi-metal, glue, tape, clips and many other fastening means. The heat energy to drive the motor and in this case the light to illuminate the load are supplied by light bulbs 6 and 20. Light bulb 6 is inserted into socket 7 while light bulb 20 is inserted into socket 19, said sockets in turn being attached to base 8 by means of straps 5. Electric current from a source not shown is introduced into wire 9 to illuminate the light bulbs.

Bi-metal arms 3 and 4 contain a metal 11 with a high coefficient of expansion and a metal 12 with a low coefficient of expansion. It should be noted that the outer surface of metal 11 is faced away from heat source 6 and 20 while the outer surface of metal 12 is faced towards heat source 6 and 20. This arrangement is preferable in order that the motor function as intended for this particular embodiment. Thus, when arm 3 is sufficiently close to light bulb 6 (as shown in the solid position) the heat emitted by the light bulb increases the temperature of bi-metal arm 3 (at least at the area near the light bulb). This causes the bi-metal to expand and metal 11, on the inside, expands at a higher rate than does metal 12 and since the bi-metal is in a concave shape, it tends to straighten out or assume a less concave profile. However, the weight of load 10 acts to constrain bi-metal arm 3 in the concave position. The heat energy, absorbed by the bi-metal arm, becomes a force tending to straighten out the arm, and this force is converted to work done on load 10 as the bi-metal lifts and swings load 10 to the left allowing it to assume a straighter shape. The net result of these two forces (the force of unequal expansion of the bi-metal and the force of load 10) is to lift load 10 allowing the right bi-metal arm to assume a less concave shape and move load 10 away from the right side light bulb 6 until the center of gravity of the load has passed over the area of support and shift the load over to the left side (as shown in the dotted position). In the dotted position the left side light bulb 20 heats bi-metal arm 4 in the same manner as described hereinabove while arm 3 is sufficiently far away from light bulb 6 to allow it to cool off. The forces described hereinabove will now act to force the load back to the right side of the diagram thus attaining a rocking motion of the load. In addition, since the bi-metal is very thin relative to its length and width, it is flexible and when load 10 shifts from one side to the other, its momentum coupled with the flexibility of the bi-metal will cause the bimetal arm to directly contact one of the light bulbs with a slight force. This slight force causes the arm to tend to bounce off the light bulb and this gives the load a push back in the opposite direction. Thus the bulb acts as a stop in addition to providing heat energy and illuminating load 10.

It should be observed that the major part of the weight of the assembled motor is in load 10 and accordingly the center of gravity will generally be located at some point above base 8. The further the center of gravity is located away from base 8 the more gravitationally unstable the assembled apparatus will be for a given load. Thus, without the action of any forces except gravity, the load and bi-metal arms will tend to remain on one side or the other supported in part by the light bulb as opposed to being positioned in a stable state in the center position. This permits the motor to self start.

The various dimensions and weights of the parts are important, although if a given arrangement performs well it can be accurately scaled up or down to give equivalent performance in a larger or smaller motor respectively. One variable to be considered is the weight of load 10. If the weight becomes too heavy the thin bi-metal will be unable to support it and the motor will not function due to collapse of the arms. Likewise, if the weight of the load is too small there will not be sufficient weight to impart gravitational instability to the motor and the motor will not shift from one side to the other. It is the result of the gravitational instability, the bi-metal strain and the particular geometry of the system that tends to shift the load from one side to the other. In addition to the weight of the load, the dimensions of the bi-metal arms are important. The bi-metal thickness is preferably thin since this imparts rapid temperature response and gravitational instability to the assembled apparatus. The thickness should be uniform along the length and width of the bi-metal strip in order to attain uniform flexing of the bi-metal perpendicular to its length when heated and to avoid cupping (flexing along its width). Cupping can be minimized by having the length of the arm at least about 4 times as long as the width and preferably at least about 8. Cupping and flexing non-perpendicular to the length of the bi-metal can permit the heated bi-metal arm to relieve the stress upon itself without lifting the load and thus hamper or even prevent smooth, uniform rocking motion. A thickness range of from about 0.001 to about 0.01 of an inch is suitable although we prefer thickness of from 0.002 to 0.004 of an inch. The length of the arm may be from about 4 inches to about 100 inches although we prefer length of from about 6 inches to about 18 inches. The width of the arm may be from about ¼ of an inch to about 12 inches although we prefer width of from ½ to about 2 inches. Again, these preferable ranges of dimensions must also be correlated along with heat and load weight to attain an operative motor. For example, one suitable combination is a thickness of 0.002 of an inch, a length of 7 inches and a width of ½ of an inch. Another suitable combination is a thickness of 0.004 of an inch, a length of 12 inches and a width of 2 inches. A third suitable combination is a thickness of 0.003 of an inch, a length of 9 inches and a width of 1 inch. In this latter combination a preferable weight is about 7 grams shaped as a rectangular board and the bi-metal arms are attached to the board at the other end of said arms about ½ an inch from each end of the board.

The heat output of the heat sources is somewhat important in order for the motor to function properly. If the heat output is too little, the load will not rock. If the heat output is too much, the heat will reach the arm furthest away from the heat source with sufficient intensity as to prevent rapid cooling and hence, the ideal rocking motion. When using light bulbs as the heat source with the 0.003 of an inch thickness bi-metal motor and other corresponding dimensions and weights described hereinbefore, preferably the wattage of the bulbs should be from about 25 to about 150 watts and more preferably from 60 to 100 watts. Although the two heat sources should preferably emit about the same amount of heat energy, there generally is some room for disparity between their energy output. Thus in the 0.003 of an inch embodiment, the motor will function if one light bulb is 60 watts while the other is 100 watts.

One of the most important factors after the motor's parts have been sized is the obtainment of a desired rocking time. The time should preferably be from about ½ of a second to about 4 seconds although we prefer times of about 1 second. The dimensions and weight of the load, thickness of bi-metal, temperature of heat source and length of travel are the primary variables in this determination. In addition, if the light bulbs are turned off or on in a cyclic manner, the time of the cycle will be an important variable in the rocking time as described hereinafter.

Figure 2:
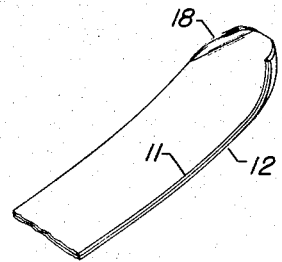
FIGURE 2 is a detail of a typical bi-metal arm used in the motor of this invention.

FIGURE 2 illustrates in greater detail a bi-metal arm 18 with the higher expanding metal 11 on the inside surface of the concave shape and the lower expanding metal 12 on the outside surface of the concave shape. One end of bi-metal arm 18 is shown having the outer edges folded over somewhat in order to attach to and support the load more securely without danger of slipping out of position. Metals 11 and 12 are selected to have a sufficiently dissimilar coefficient of expansion to produce a highly temperature responsive bi-metal. In this type of motor, I prefer the use of a bi-metal which gives a large deflection per unit temperature rise. In one preferable bi-metal, metal 11 is a manganese, copper and nickel alloy while metal 12 is an iron and nickel alloy. An especially preferable composition of metal 11 is 72% manganese, 18% copper and 10% nickel while an especially preferable composition of metal 12 is 36% nickel and 64% iron.

Figure 3:
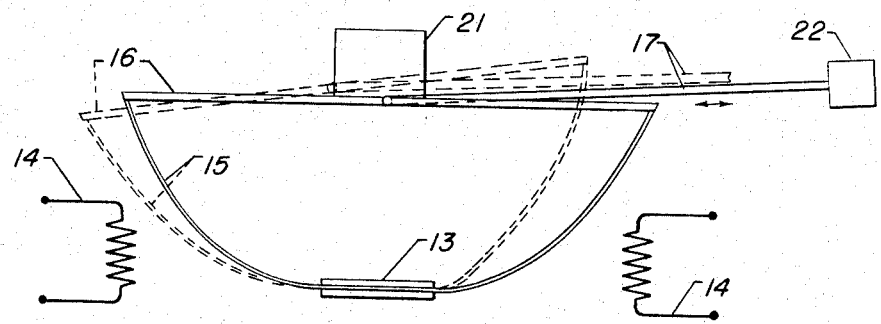
FIGURE 3 is another embodiment of the present invention in which a drive shaft is connected to the tie bar connecting the other ends of the bi-metal arms to produce a forth and back motion to drive a foreign load.

An alternate embodiment of the present invention is shown in FIGURE 3. Again bi-metal arms 15 are supported at one end by base 13. Heat sources 14, shown as resistance type heaters are employed to change the temperature of the bi-metal arms 15. The other ends of bi-metal arms 15 are connected to each other by tie bar 16 and the tie bar supports primary load 21. A drive shaft 17 is pivotally mounted on tie bar 16 and the rocking motion of the motor imparts a forth and back motion to the drive shaft. The drive shaft is connected to some secondary load 22 to move said load. Preferably this foreign load is also gravitationally unstable so that it coacts with the movement of the bi-metal to produce the same effect as the load mounted on top of the tie bar. Alternately, the secondary load may be of sufficiently low resistance that the bi-metal motor can move the secondary load without this load being gravitationally unstable. This may be readily accomplished by counterbalancing the moving members of the secondary load.

We prefer to construct the motor such that the load is slightly off center thereby having one of the bi-metal arms resting on the light bulb. Thus when the current is permitted to flow to turn the light bulbs on, the motor will start itself and continue rocking until the current to the bulbs is turned off. If the load is shifted too much off center, however, a smooth rocking motion will not be attained.

The load is preferably supported substantially equally between each arm in order to attain a smooth rocking motion. In some cases it may be preferable to shift the points of support for the load so that one arm supports slightly more weight than the other which makes the load off center and which permits self-starting as described hereinbefore. However, when using bi-metal as thin as 0.003 of an inch, generally the flexibility of the arms is sufficiently great to insure that the load will rest on one side or the other when the heat source is not in operation. It is preferable that the arms support the load near the ends of the load. However, if the load is irregularly shaped it is necessary to adjust the position of the arms in an irregular fashion in order that the weight of the load be substantially equally supported by each arm.

Figure 4:
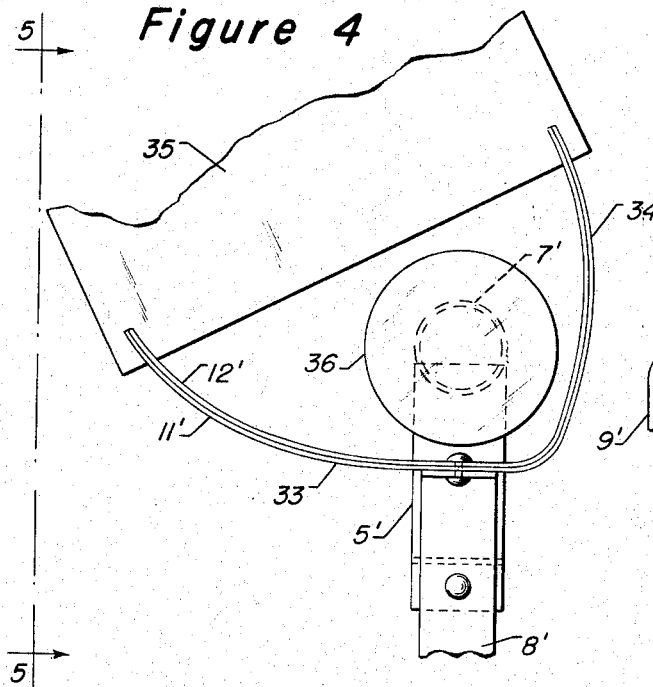
FIGURE 4 is an alternate embodiment of the present invention having a single heat source positioned between the bi-metal arms thereby acting as a common heat source.

FIGURE 4 shows an alternate preferable embodiment in which one heat source is used to heat both bi-metal arms. Bi-metal arms 33 and 34 are heated by light bulb 36 and result in load 35 rocking from one side to the other as described hereinbefore. The major distinction in this embodiment is the use of a single common heat source. Light bulb 36 preferably projects into the path traveled by arms 33 and 34 and accordingly acts as a stop to limit the length of travel of each arm. Accordingly, the diameter of the light bulb as well as its heat output are variables in determining the time for the motor to rock from one side to the other. Base 8' supports a pair of flexible metal arms 33 and 34, at least one of which is bi-metal, as well as strap 5' which in turn supports light bulb 36. It should also be noticed that the position of the high and low expansion metals that compose the bi-metal are reversed with respect to the surroundings from the embodiment shown in FIGURE 1 but are the same with respect to the light bulb. In FIGURE 4 high expansion metal 11' is faced away from heat source 36 while low expansion metal 12' is faced toward heat source 36. The arrangement of bi-metal is preferable in order to efficiently utilize the forces produced by the unequal expansion of bi-metal to rock load 35.

Figure 5:
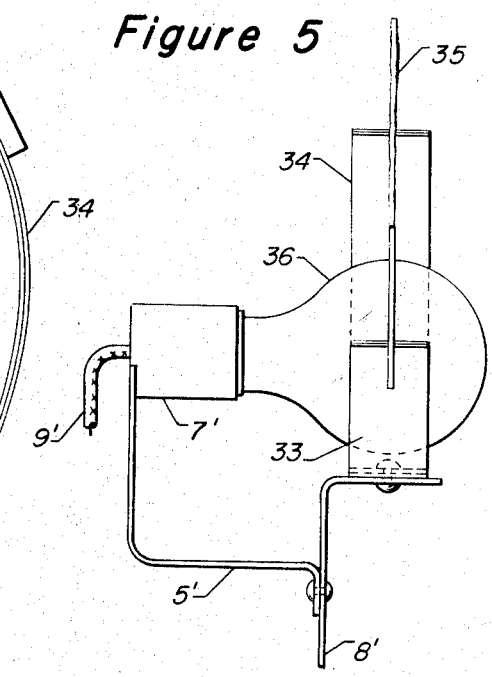
FIGURE 5 is a side view of the embodiment shown in FIGURE 4.

FIGURE 5 shows the same embodiment as FIGURE 4 only from the side view. In this view it is more clearly shown that heat source 36 projects into the path traveled by arms 33 and 34 thus acting as a stop. In this view base 8', straps 5', electric line 9', socket 7' and load 35 are visible.

Figure 6:
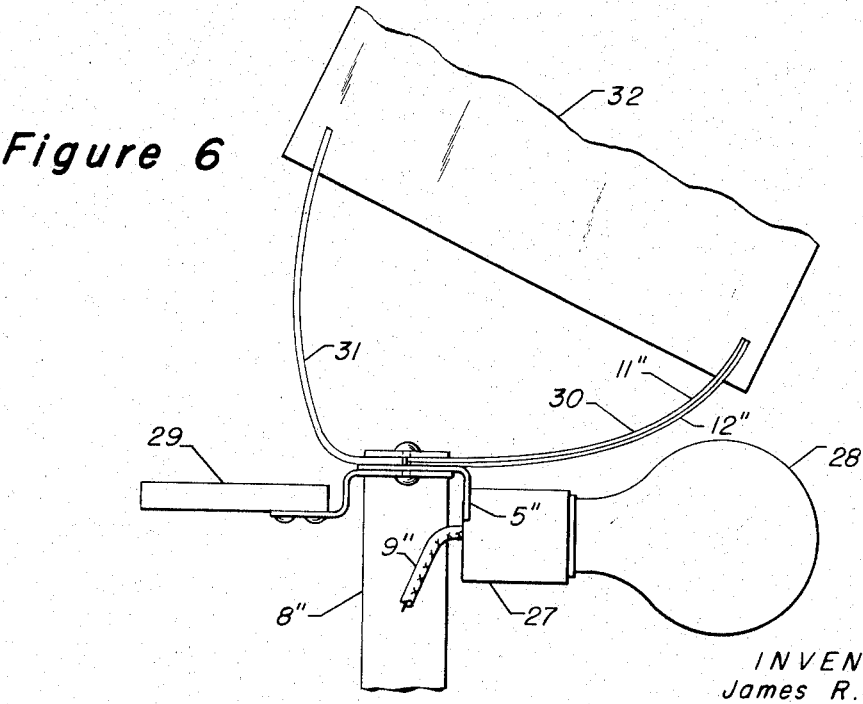
FIGURE 6 is another alternate embodiment of the present invention having a single heat source and two metal arms, one of which is bi-metal.

FIGURE 6 shows still another alternate preferable embodiment employing two flexible metal arms, only one of which is bi-metal. Base 8" supports flexible metal arm 31 and flexible bi-metal arm 30, said arms being attached at one end to said base. Both arms 30 and 31 are attached at their other end to display load 32 and form the support for load 32. The heat energy to drive the motor and in this case to illuminate the load is supplied by light bulb 28. Light bulb 28 is inserted into socket 27 which in turn is attached to base 8" by means of strap 5". Electric current from a source not shown passes through wire 9" to illuminate the light bulb. Shoulder 29 projects outward toward the left side from base 8" and acts as a stop for arm 31 when load 32 is in the left most position. As described hereinbefore light bulb 28 acts as a stop for bi-metal arm 30. In this system the outer surface of high expansion metal 11" is faced away from heat source 28 while the outer surface of low expansion metal 12" is faced toward heat source 28. It has been found that the motor will function efficiently with only one bi-metal arm and accordingly only one heat source is needed. This particular embodiment may be modified by placing light bulb 28 between and into the path traveled by arms 30 and 31 in a similar manner to that shown in FIGURES 4 and 5. In this latter modified form the position of metals 11" and 12" would be reversed with respect to the surroundings from that shown in FIGURE 6.

Another alternate embodiment is to reverse metals 11 and 12 with respect to the surroundings from that shown in FIGURE 1 and to replace light bulbs 6 and 20 with cold sources. A fourth possible embodiment is to place a cold source in the center area and maintain metals 11 and 12 as shown in FIGURE 1 (high expansion metal 11 on the inside and low expansion metal 12 on the outside). When using cold sources, it is the heat in the surrounding atmosphere that provides the energy to rock load 10. However, it is generally preferable to use heat sources rather than cold sources since this is more convenient and less expensive. Furthermore, it is especially preferable to use light bulbs as the heat source since the light emitted is used to illuminate the load and the bulb can effectively act as a stop to the swing of the arms and load. Other resistance type heaters may also be used although they should be covered with both electrical and thermal insulation since the resistance wire carries electric current and is generally too hot to permit direct contact with the bi-metal arms whereas the outer surface of the light bulb runs at a sufficiently low temperature to permit direct contact.

It may be seen that our motor can be powered by any source of heat and thus may be viewed as a scavenger of waste heat, converting said waste heat into mechanical energy.

Another improvement that is intended to be incorporated in our invention, especially when the motor is employed in the display field, is to flash the light bulbs independent of or in synchronization with the rocking of the arms to light the light bulb at the desired point in time in order to attain effective illumination and produce an attractive display. The cyclic turning off and on of the light bulb can be accomplished by any convenient means such as fixed time flashers, flashers synchronized with the motor movement, switches which are activated by the movement of the bi-metal arms, other timed circuit switching devices, etc. It may be desired to illuminate the light bulb just as the load approaches the light bulb in order to emphasize and shed light on the message carried on the load. Likewise, it may be desired only to flash the light bulbs randomly and/or independent of the movement of the load. The bi-metal motors tend to have a natural rocking period dependent on the geometry of the motor, weight of the load, etc. By flashing the light bulbs, the natural rocking period tends to remain constant and therefore, independent of the extent of flashing. This flashing may also be viewed as using lower output heat sources since flashing high wattage light bulbs is somewhat equivalent to constantly lighted lower wattage bulbs. The flashed light bulbs tend to retain a portion of their heat while they are not illuminated and the retained heat will maintain the motor's rocking motion. Of course, if the light bulbs are not illuminated often enough the motor will not rock in a smooth desirable manner. A given light bulb should be illuminated at least 5% of the motor operating time and preferably at least about 25% to attain a smooth motion. This particular improvement is highly advantageous in the display field since a flashing light and a moving display are simultaneously obtained which will attract the eye of a passing person.

In certain designed motors the flashing can be used to control the time for rocking. These motors are the heavy duty motors having thicker bi-metal and having a slow rocking period. These heavy duty motors are employed to attain a higher work output for moving heavy loads.

It is also within the scope of this invention to design the motor to move in a semi-rocking arc as contrasted to the full rocking arc described hereinbefore. In this case the motor is geometrically designed so that the load does not shift over center. When the load is close to the heat source, the bi-metal strain forces the load away from the heat source as described hereinbefore. However, before the load shifts over center, the bi-metal arm cools off sufficiently to diminish the force on the load, and the load and arm return to the heat source thus attaining a rocking motion composed of an arc about ½ of that previously described.

Although this invention is primarily described hereinbefore with particular reference to advertising or displaying items, it will be understood that this is merely for the purpose of illustration and that the invention in its broadest sense is a motor, capable of converting heat energy into mechanical energy. The invention is generally applicable to a wide variety of uses such as in novelties, toys, safety or control devices, scientific instruments and various other applications where forth and back movement is desired.

We claim as our invention:

1. A motor which comprises:
   a base;
   a first bi-metallic arm connected at one end to said base;
   a second arm connected at one end to said base;
   connecting means from the other end of the first bi-metallic arm to the other end of the second arm, said arms and said means forming a rocking member; and
   at least one temperature source having a temperature different from ambient located sufficiently close to the first bi-metallic arm to change the temperature of said first arm when the rocking member approaches the temperature source.

2. The motor of claim 1 further characterized in that the arms are flexible, the connecting means comprise a load and the temperature source is a heat source.

3. The motor of claim 2 having two heat sources which comprises:
   a base;
   a first flexible bi-metallic arm connected at one end to said base and capable of flexing sufficiently close to one of the heat sources to change the temperature of the bi-metal at some point along its arm;
   a second flexible bi-metal arm connected at one end to said base and capable of flexing sufficiently close to the other heat source to change the temperature of the bi-metal at some point along its arm; and
   a load attached to the other end of the first bi-metallic arm and to the other end of the second bi-metallic arm and positioned to support the weight of the load substantially equally between each arm.

4. The motor of claim 2 further characterized in that the load is gravitationally unstable, the rocking member moves in a rocking motion and the heat source is at least one light bulb.

5. The motor of claim 4 further characterized in that the second arm is bi-metal, a single light bulb is positioned between the first arm and the second arm to provide heat energy to both arms, one at a time and the bi-metal arms are arranged to have the outer surface of the metal having the higher coefficient of expansion faced away from the light bulb and the outer surface of the metal having the lower coefficient of expansion faced toward the light bulb.

6. The motor of claim 4 further characterized in that the second arm is bi-metal, a first light bulb is attached to the base to provide heat energy substantially only to the first arm, a second light bulb is attached to the base to provide heat energy substantially only to the second arm and the bi-metal arms are arranged to have the outer surface of the metal having the higher coefficient of expansion faced away from its light bulb and the outer surface of the metal having the lower coefficient of expansion faced toward its light bulb.

7. The motor of claim 4 further characterized in that the second arm is a single metal having substantially the same length and thickness as the first bi-metallic arm.

8. The motor of claim 4 further characterized in that a drive shaft is attached to the connecting means to transfer energy to a foreign load by means of the forth and back motion of the drive shaft.

9. The motor of claim 4 having two light bulbs which comprises:
   a base;
   a pair of light bulbs connected to the base;
   a first flexible bi-metallic arm connected at one end of said base and having sufficient flexibility to rock close enough to one of the light bulbs to permit an increase in temperature at some point along its length;
   a second flexible bi-metallic arm connected at one end to said base and having sufficient flexibility to rock close enough to the other light bulb to permit an increase in temperature at some point along its length; and
   a weight connected at the other end of each bi-metallic arm and having its center of gravity positioned above the other ends of the arms to create an overall body which is gravitationally unstable.

10. The motor of claim 5 further characterized in that the bi-metal arms have a thickness of from about 0.002 to about 0.004 inch, a length of from about 6 to about 18 inches and a width of from about 0.5 to about 2 inches.

11. The motor of claim 6 further characterized in that the bi-metal arms have a thickness of from about 0.002 to about 0.004 inch, a length of from about 6 to about 18 inches and a width of from about 0.5 to about 2 inches.

12. The motor of claim 6 further characterized in that the light bulbs are cyclically turned off and on.

13. The motor of claim 6 further characterized in that the light bulbs are positioned to act as stops, each bulb limiting the length at one end that the rocking member travels.

References Cited

UNITED STATES PATENTS 2,382,928   8/1945   Whitney et al. _____ 60—23

MARTIN P. SCHWADRON, *Primary Examiner.*

ROBERT R. BUNEVICH, *Examiner.*